US005944931A

United States Patent [19]

Cranford

[11] Patent Number: 5,944,931

[45] Date of Patent: Aug. 31, 1999

[54] METHOD AND APPARATUS FOR PRINTING A SUBLIMATION TRANSFER ONTO MUGS WITH HANDLES

[75] Inventor: Gary Cranford, Covington, Tenn.

[73] Assignee: Atlas Crystal Works, Inc., Covington, Tenn.

[21] Appl. No.: 09/095,500

[22] Filed: Jun. 11, 1998

[51] Int. Cl.[6] .......... B44C 1/165; B32B 31/00

[52] U.S. Cl. .......... 156/230; 156/240; 156/247; 156/277; 156/494

[58] Field of Search .......... 156/230, 234, 156/235, 237, 239, 240, 241, 247, 277, 289, 494

[56] References Cited

U.S. PATENT DOCUMENTS

| | | | |
|---|---|---|---|
| 3,130,107 | 4/1964 | Shank, Jr. | 156/559 |
| 3,816,221 | 6/1974 | Shank, Jr. | 156/492 |
| 4,874,454 | 10/1989 | Talalay et al. | 156/359 |
| 4,959,008 | 9/1990 | Wasulko | 428/40 |
| 5,019,193 | 5/1991 | Aramini | 156/64 |
| 5,170,704 | 12/1992 | Warren et al. | 101/41 |
| 5,244,529 | 9/1993 | Siegel | 156/384 |
| 5,296,081 | 3/1994 | Morin et al. | 156/498 |
| 5,382,313 | 1/1995 | Eminger | 156/583 |
| 5,395,478 | 3/1995 | Sattler et al. | 156/481 |
| 5,463,948 | 11/1995 | Newman | 101/127 |
| 5,594,961 | 1/1997 | Ellsworth et al. | 156/481 |
| 5,630,894 | 5/1997 | Koch et al. | 156/64 |
| 5,755,921 | 5/1998 | Christensen | 156/361 |

*Primary Examiner*—David A. Simmons
*Assistant Examiner*—J. A. Lorengo
*Attorney, Agent, or Firm*—Sixbey, Friedman Leedom & Ferguson; Frank P. Presta; Joseph S. Presta

[57] ABSTRACT

An improved method and apparatus for use in printing a sublimation transfer on a container having a handle, such as a cup or mug. The method includes providing a sublimation transfer having a length which completely encircle the outer surface of the container. The sublimation transfer includes at least one cut-out portion on an edge portion thereof, wherein the cut-out portion has a shape which is generally complimentary to the shape of the handle where it connects with the container, thereby enabling the sublimation transfer to encircle the handle connection area. The sublimation transfer is pressed against the container and heat is applied to the sublimation transfer to cause printing on the container. The method enables the printing to completely encircle the handle connection areas, thereby enabling printing on the entire visible outer surface of the container, including the area around and under the handle itself.

6 Claims, 4 Drawing Sheets

METHOD AND APPARATUS FOR PRINTING A SUBLIMATION TRANSFER ONTO MUGS WITH HANDLES

BACKGROUND OF THE INVENTION

The present invention relates generally to the field of sublimation transfers, and more particularly to an improved method and apparatus for applying heat transferable decals to containers or other similar articles having a handle, such as mugs or cups.

Well known techniques have been developed over the years for decorating and personalizing containers, such as ceramic cups, mugs and the like. One common technique used for this purpose is sublimation printing, wherein sublimation transfers are used which incorporate sublimable dyes in the form of a decorative design, image and/or any other desired indicia for transferring to the mug. To decorate a mug in this manner, the sublimation transfer is placed in direct contact with the mug which has been coated with a polymeric coating. Typically, a device, such as a cuff, is used to press the sublimation transfer against the mug. The mug is then heated to a temperature at least as high as sublimation temperature of the dyes constituting the image to be printed. This process causes vaporization of the dyes constituting the image and their immediate absorption into the polymeric coating on the mug, thereby resulting in the image being transferred from the sublimation transfer to the mug.

Sublimation printing is well known in the art and numerous processes and devices have been developed in the past for transferring images and the like to the surface of mugs and similar articles by sublimation. For example, the following U.S. Patents describe various techniques and equipment to effect sublimation transfers and/or other similar operations.: U.S. Pat. No. 5,244,529 to Siegel (1993); U.S. Pat. No. 5,296,081 to Morin et al. (1994); U.S. Pat. No. 5,584,961 to Ellsworth et al. (1996); U.S. Pat. No. 5,395,478 to Sattler et al. (1995); U.S. Pat. No. 5,382,313 to Eminger (1995); U.S. Pat. No. 5,019,193 to Aramini (1991); U.S. Pat. No. 5,170,704 to Warren et al. (1992); U.S. Pat. No. 4,874,454 to Talalay et al. (1989); U.S. Pat. No. 3,816,221 to Shank, Jr. (1974); and U.S. Pat. No. 5,630,894 to Koch et al. (1997).

While the prior art sublimation printing techniques and equipment have proven to work effectively in producing images on mugs and the like, they all suffer from the disadvantage of being unable to print an image or design on the entire outer surface of a mug when the mug includes a handle. More particularly, the prior art techniques and equipment cannot print around or under the handle of a mug, because the handle itself precludes conventional sublimation transfers and cuffs from being applied around and under the handle. As a result, the images on mugs with handles produced with prior art techniques do not continue around the entire mug, but, instead, stop in the vicinity of the handle.

Thus, a need exists for an improved sublimation printing method and apparatus which overcomes the disadvantages of the prior art.

SUMMARY OF THE INVENTION

It is therefore a primary object of the present invention is to provide an improved method and apparatus for printing sublimation transfers on containers with handles, such as mugs and cups.

A further object of the present invention is to provide an improved method of printing sublimation transfers on containers with handles, wherein the printing can be achieved on the entire outer surface of the container including the area around and under the handle.

Another object of the instant invention is to provide an improved method of printing sublimation transfers on mugs with handles, which method results in a more aesthetically pleasing mug as compared to prior art printing methods.

Yet another object of the instant invention is to provide an improved sublimation transfer which enables printing on the entire outer surface of a container without interference from the handle, including the area around and under the handle.

A further object of the invention is to provide an improved cuff apparatus for use when printing a sublimation transfer on a container with a handle, which cuff apparatus can be used to uniformly press a sublimation transfer against the entire outer surface of a container regardless of the size shape or location of the container handle.

Another object of the invention is to provide an improved method and apparatus which can quickly, easily and inexpensively produce custom printing on containers with handles, such as cups and mugs.

These and other objects and advantages are achieved by the present invention, which provides an improved method of applying a sublimation transfer to a container having a handle, such as a cup or mug, wherein the handle is connected to the container at at least one connection area on the outer surface thereof. The method includes providing a sublimation transfer having a length which enables the sublimation transfer to completely encircle the outer surface of the container. The sublimation transfer includes at least one cut-out portion on an edge portion thereof, wherein the cut-out portion has a shape which is generally complimentary to the shape of the connection area and enables the sublimation transfer to encircle the connection area. The sublimation transfer is pressed against the container and heat is applied to the sublimation transfer to cause printing on the container. The method enables the printing to completely encircle the handle connection areas, thereby enabling printing on the entire visible outer surface of the container, including the area around and under the handle itself.

In accordance with a more particular aspect of the invention, the step of pressing the sublimation transfer against the container includes placing a cuff around the sublimation transfer and container, wherein the cuff has a shape which is generally complimentary to the shape of the sublimation transfer with the cut-out portions.

In accordance with another aspect of the invention, an improved sublimation transfer is provided for use in printing on containers with handles, such as cups and mugs. The sublimation transfer includes a body portion, opposed first and second edges, and a length between the first and second edges which enables the sublimation transfer to fully encircle the outer surface of the container. The sublimation transfer includes at least one cut-out portion having a size and shape which enables the sublimation transfer to completely encircle the handle connection area when placed around the container, thereby enabling printing on the entire outer surface of the container.

In accordance with a more particular aspect of the sublimation transfer, a complimentary pair of cut-out portions are provided for each handle connection area, wherein each cut-out portion has a size and shape which cooperatively enables the sublimation transfer to encircle each handle connection area when placed on the container.

In accordance with yet another aspect of the invention, a improved cuff is provided for use during printing of a sublimation transfer on a container with a handle, such as a cup or mug. The cuff includes a generally cylindrical and expandable cuff body adapted to encircle the container and press a sublimation transfer against the outer surface thereof. The cuff further includes at least one cut-out portion in the cuff body which enables the cuff body to encircle the handle connection area when placed around the container. The cuff is operable to apply pressure to substantially all of the outer surface of the container, thereby assisting in printing a sublimation transfer on the entire outer surface of a container, including the area around and under the handle.

BRIEF DESCRIPTION OF THE DRAWINGS

Other objects and advantages of the subject invention will become apparent from a study of the following specification when viewed in light of the accompanying drawings, in which.

DETAILED DESCRIPTION OF THE PREFERRED EMBODIMENTS

Figure 1:
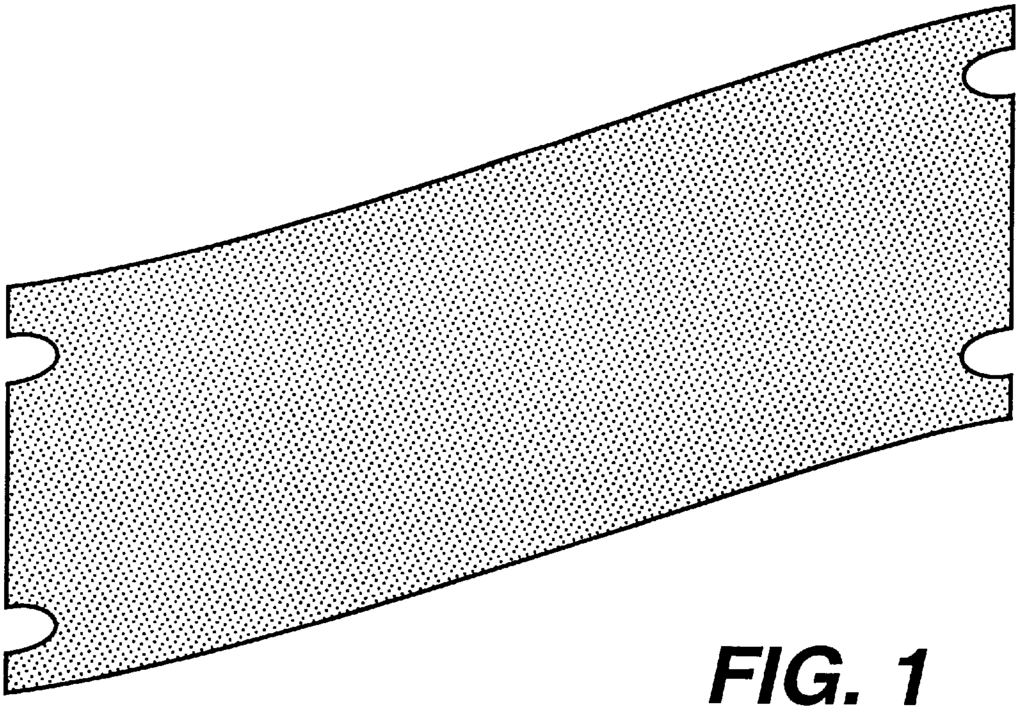
FIG. 1 shows a sublimation transfer in accordance with a preferred embodiment of the present invention.

Referring now to the drawings, wherein like reference numerals designate similar parts throughout the various views, and more particularly to FIG. 1 thereof, there is shown a sublimation transfer 10 constructed in accordance with the instant invention. The sublimation transfer includes a substrate or transfer 12 of any suitable and known material, such as paper, bearing a sublimable dye image 14. The image 14 may be any type of image, design, decoration, text, or the like with which is desired to have printed on an article. Inasmuch as sublimable dyes and the sublimation process are generally well known to persons skilled in the art, specific details regarding the transfer 12 and dye image 14 are not further discussed herein.

In accordance with an important aspect of the instant invention, the sublimation transfer includes cut-out portions 16, 18, 20 and 22, the purpose of which will be explained in detail below. The cut-out portions are preferably located along the edges 24 and 26 of the sublimation transfer 10, and may be formed by any suitable manner, such as by a cutting or stamping operation.

Figure 2:
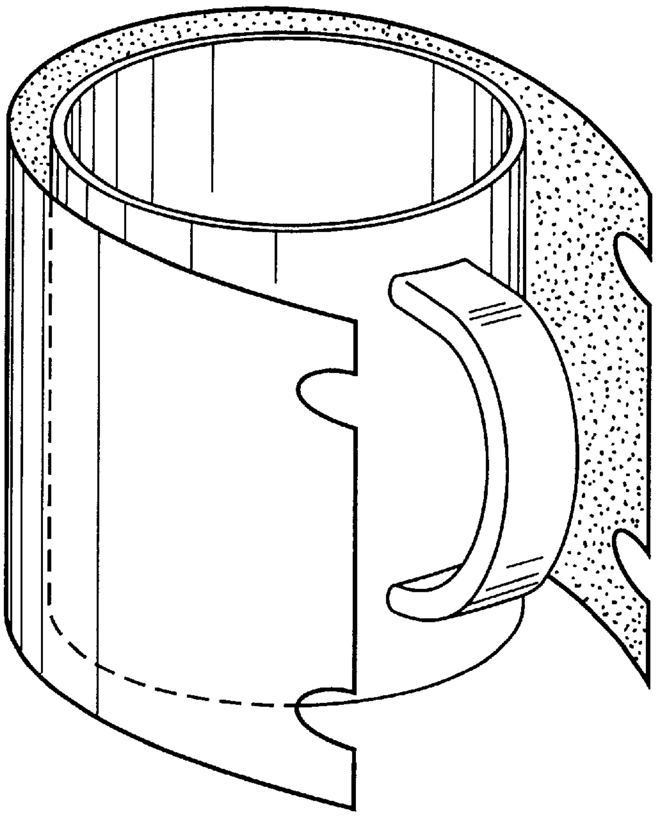
FIG. 2 shows the sublimation transfer of FIG. 1 being placed around a mug in accordance with the present invention.

Referring now to FIG. 2, the sublimation transfer 10 is designed to be placed around a container 28 having a handle 30, such as a cup, mug or any other type of container 28 on which sublimation printing of the image 14 is desired. The sublimation transfer 10 is wrapped around the mug 28 with the image 14 facing inwardly against the outer surface 32 of the mug 28. It is noted that the mug 28 shown in FIG. 2 is a common type of mug, such as a ceramic mug, having a typical handle 30 which is generally U-shaped and connects with the mug 28 at two connection points or areas 34 and 36. Prior to placing the sublimation transfer 10 around the mug 28, the outer surface 32 of the mug is coated with a polymeric coating to facilitate printing, as one skilled in the art readily understands.

The sublimation transfer 10 preferably has a length which enables the edges 24 and 26 to abut against one another, or at least come within close proximity with one another, when the sublimation transfer 10 is wrapped around the mug 28. Thus, the length of the sublimation transfer 10 is selected to correspond to the particular size of the mug 28. As can be seen from the preferred embodiment of the invention shown in FIG. 2, the cut-out portions 16, 18, 20 and 22 have a size, shape and location on the transfer 10 which generally corresponds to the size shape and location of the handle 30 at connection areas 34 and 36. This feature enables the transfer 10 to cover the entire outer surface 32 of the mug 28. In other words, the cutout portions 16 and 20 have a complementary size and shape to that of the handle 30 at the connection area 34, and cut-outs 18 and 22 have a complementary size and shape to that of the handle 30 at connection area 36. This feature enables that transfer 10 to fit around and under the handle 30, so that edges 24 and 26 can come into abutting relationship without interference from the handle 30. This allows the image 14 on the transfer 10 to be in contact with the entire outer surface 32 of the mug 28, including the portion of the outer surface located around and under the handle 30. The transfer 10 may be temporarily held in position on the cup by tape (not shown).

While four cut-out portions 16, 18, 20 and 22 are shown in the embodiment of FIG. 2, any suitable number of cut-outs can be used depending on the shape of the handle 30 and the manner in which it connects with the mug 28. For example, if the handle 30 only had one connection to the mug 28, only two complementary cut-out portions could be used. In addition, only one edge 24 or 26 could include a cut-out portion, if the cut-out portion was made deep enough to enable the entire handle at the connection location to be received therein. In other words, there are numerous alternative configurations available for the cut-out portions, and any may be used in accordance with the invention to enable the transfer 10 to fit around and encircle the handle 30 at the connection locations, so that the transfer 10 can be in contact with the entire outer surface 32 of the mug 28 without interference from the handle 30.

Figure 3:
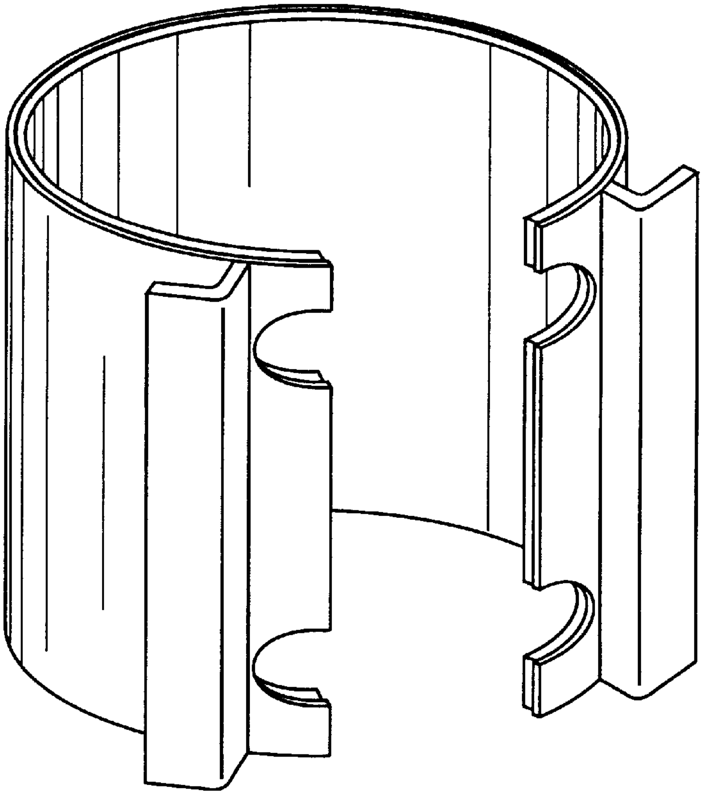
FIG. 3 shows a preferred embodiment of a cuff used to press the sublimation transfer against the mug in accordance with the instant invention.

Referring now to FIG. 3, a preferred embodiment of a cuff 38 is shown for use in pressing the transfer 10 against the mug 28 to help assure that a high quality and complete image transfer will occur. The cuff 38 includes a cuff body 40 which is expandable, by spreading ends 42 and 44, to enable the cuff 38 to be placed around the mug 28 with transfer 10 thereon. In accordance with an important aspect of the instant invention, the cuff 38 includes cut-out portions 42, 48, 50 and 52 which generally correspond in size, shape and location to the cut-out portions 16, 18, 20 and 22 on the transfer 10. As explained above with respect to the transfer 10, the particular number and configuration of the cut-out portions on the cuff 38 depends on the particular configuration of the handle 30 on which the cuff 38 is placed. More particularly, as with the transfer 10, the cuff is constructed to enable edges 42 and 44 to abut against one another when placed around the mug 28 without interference from the handle 30. This enables the cuff 28 to exert uniform pressure on the entire transfer 10 during the sublimation process. Flanges 54 and 56 are preferably provided on the cuff 38 adjacent edges 42 and 44, the purpose of which will be explained below. The cuff 38 may also include a resilient liner 58 around the inner wall of the cuff body 40 for helping to apply uniform pressure to the entire transfer 10 during the sublimation process.

Figure 4:
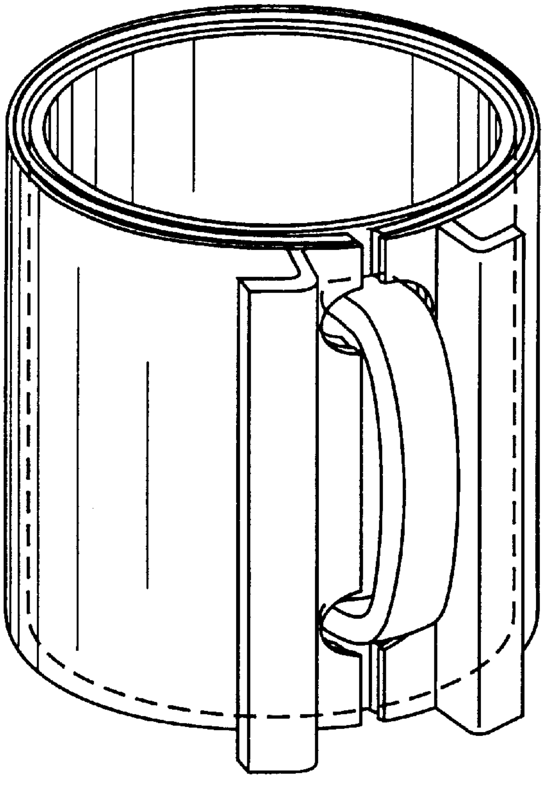
FIG. 4 shows the cuff of FIG. 3 placed around a mug in accordance with the instant invention.
Figure 5:
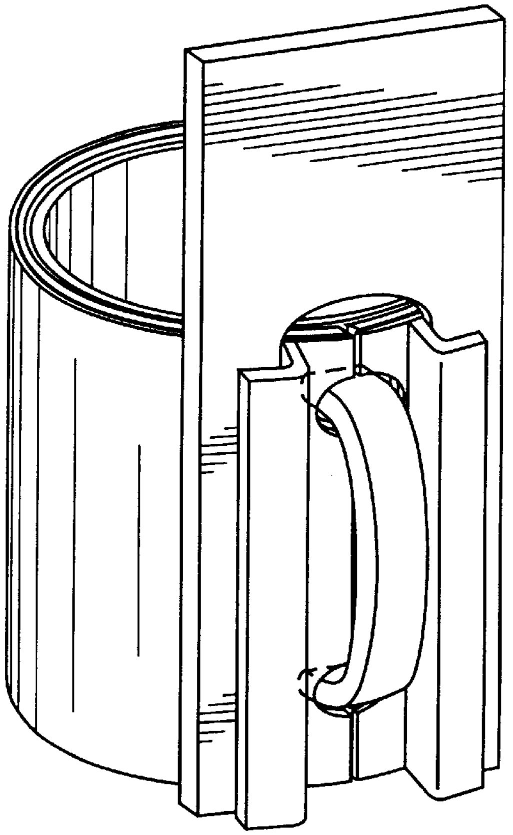
FIG. 5 shows the cuff and mug of FIG. 4 having a locking device thereon for maintaining the cuff tightly around the mug.
Figure 6:
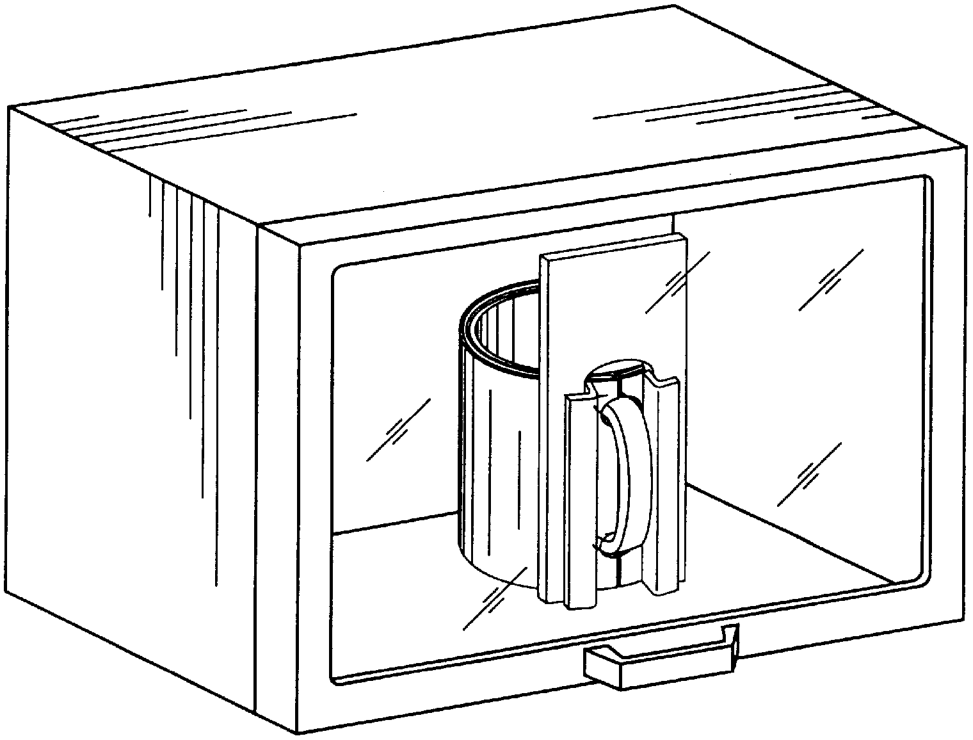
FIG. 6 shows the mug and cuff in an oven for causing transfer of the decal to the mug by heat.

As shown in FIG. 4, the cuff 38 is designed to fit snugly around the mug 28 with the sublimation transfer 10 being clamped between the cuff 28 and the mug 28. The cut-out portions in the cuff 28 enable the handle 30 to extend out through the cuff without interfering with the sublimation process. In order to securely clamp and lock the cuff 38 in position on the mug 28, a locking device 60 is preferably used which slides down over and cooperates with the flanges 54 and 56 to lock the cuff 38 in place on the mug 28.

Once the cuff is locked onto the mug 28, the entire assembly is placed in an oven 62 which is operable to heat the transfer 10 sufficiently to cause the dye on the transfer 10 to be transferred onto the polymeric coating on the mug 28 by sublimation printing, thereby creating a desired image on the mug 28. The assembly is typically heated at 380 degree for approximately 15 to 20 minutes to achieve a complete image transfer. After the image transfer is complete, the locking device 60 and cuff 38 are removed and can be reused, and the transfer substrate 12 is removed and discarded. The completed mug 28 bearing the image 64, as shown in FIG. 7, is then ready for use or sale.

Figure 7:
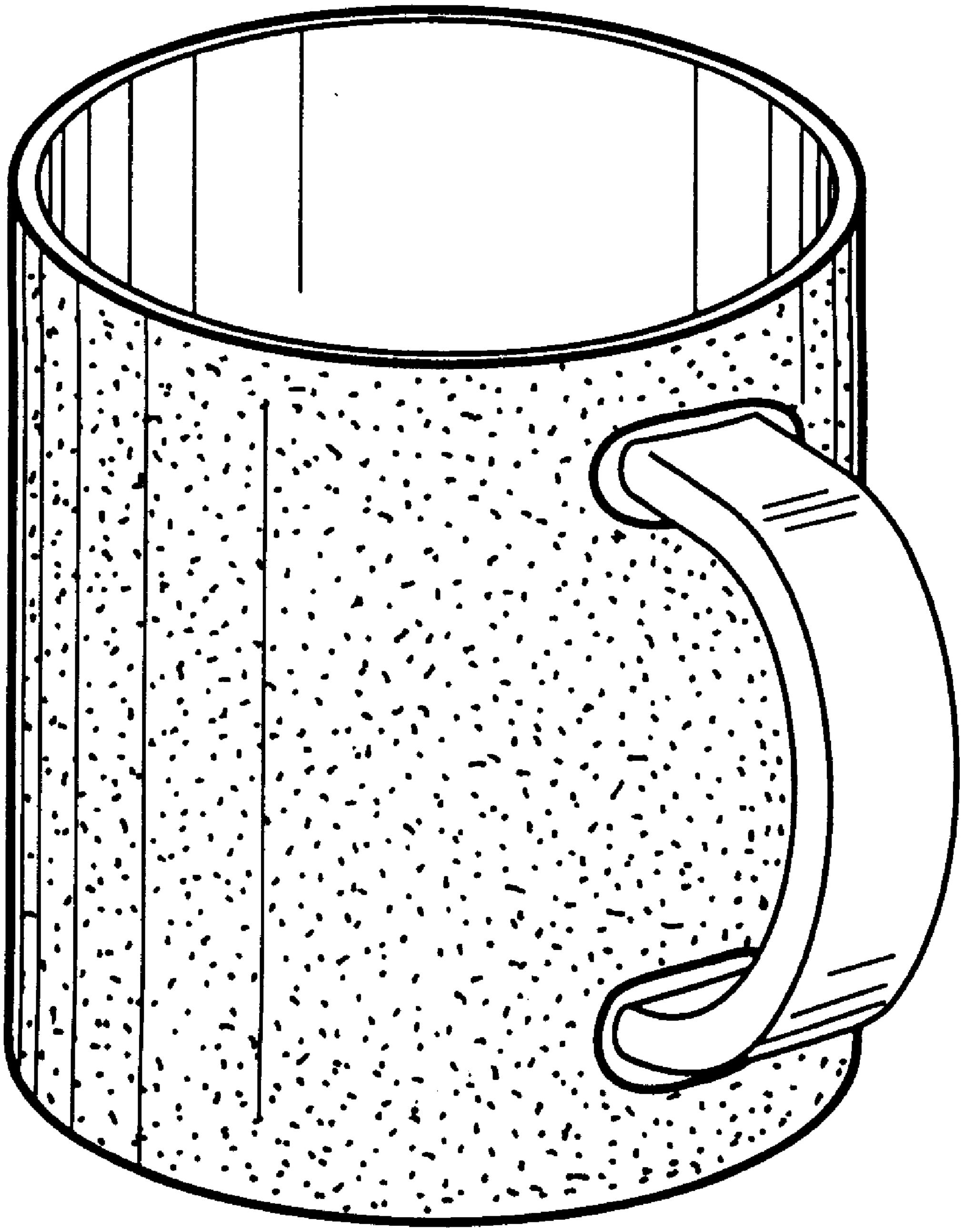
FIG. 7 shows a printed mug produced in accordance with the instant invention.

As can be seen from the description above, and most clearly from FIG. 7, the instant invention overcomes the disadvantages of the prior art by enabling an image 64 to be quickly and ecomically applied to the entire outer surface 32 of a container, such as a mug 28 or any other suitable article, regardless of the location, size or shape of the handle 30 on the container.

While the preferred forms and embodiments of the invention have been illustrated and described, it will be apparent to those of ordinary skill in the art that various changes and modifications may be made without deviating from the inventive concepts and true spirit of the invention as set forth above, and it is intended by the appended claims to cover all such changes and modification which come within the full scope and true spirit of the invention.

What is claimed is:

1. A method of applying a sublimation transfer to a container having a handle, wherein said handle is connected to said container at at least one connection area on said outer surface of said container, said method comprising the steps of: providing a sublimation transfer having a length which enables said sublimation transfer to substantially completely encircle an outer surface of said container, and having at least one cut-out portion at an edge portion thereof, wherein said cut-out portion has a shape which is generally complimentary to a shape of said connection area and enables said sublimation transfer to generally encircle said connection area; pressing said sublimation transfer against said container; and applying heat to said sublimation transfer sufficient to cause printing of said sublimation transfer on said container, wherein said printing encircles said connection area.

2. A method as defined in claim 1, wherein said step of pressing said sublimation transfer against said container includes placing a cuff around said sublimation transfer and container, wherein said cuff has a shape which is generally complimentary to a shape of said sublimation transfer and said at least one cut-out portion.

3. A method as defined in claim 2, further including the step of removing said cuff and said sublimation transfer after said printing.

4. A method as defined in claim 1, wherein said handle is connected to said container at two connection areas, said method further comprising providing a plurality of said cut-out portions on said sublimation transfer, each of said cut-out portions having a size, shape and location which enables said sublimation transfer to generally encircle said two connection areas.

5. A method as defined in claim 4, wherein said step of providing a plurality of said cut-out portions includes providing two of said cut-out portions on a first edge of said sublimation transfer and two of said cut-out portions on a second edge of said sublimation transfer, wherein each of said cut-out portions at least partially encircles one of said two connection areas in a manner which cooperatively enables said sublimation transfer to fully encircle each of said two connection areas.

6. A method as defined in claim 1, further including the step of providing said sublimation transfer with a width which corresponds to a height of said container and such that said sublimation transfer covers substantially all of said outer surface of said container, and further wherein said printing occurs on substantially all of said outer surface.

* * * * *